United States Patent Office 3,311,081
Patented Mar. 28, 1967

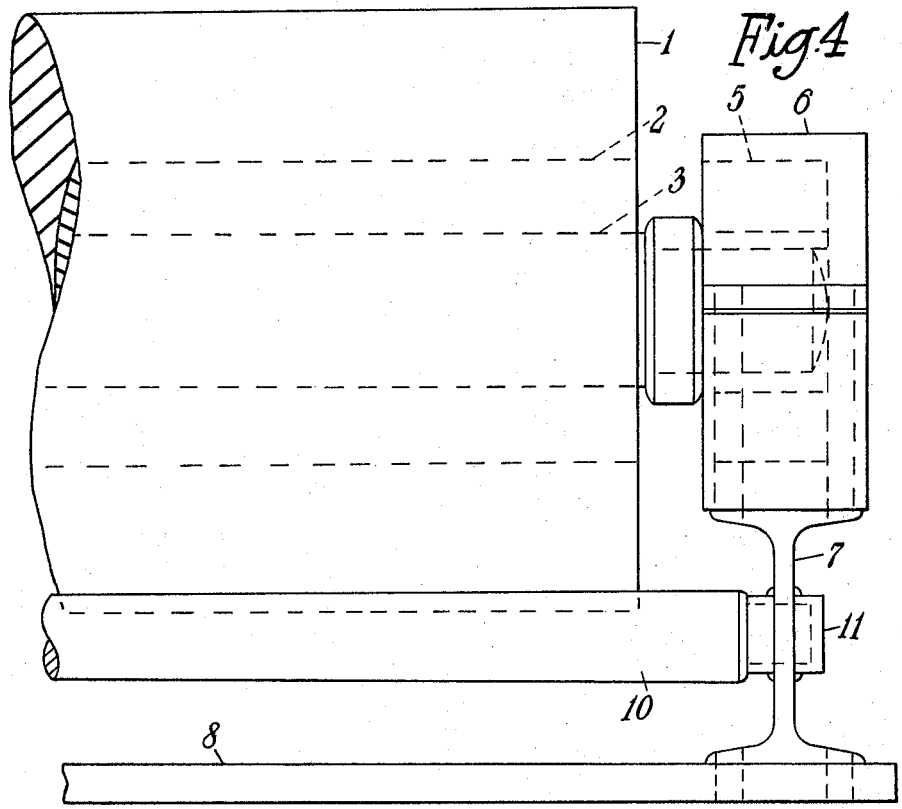
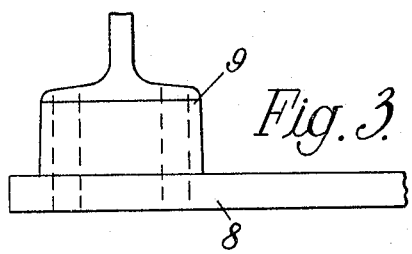
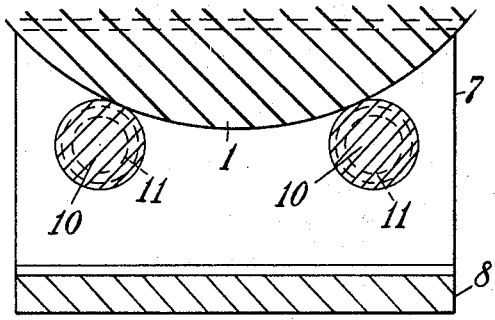

3,311,081
DOCK AND LIKE FENDERS
Wilfred Samuel Parker, Wombourne, England, assignor of one-half to Edge and Sons Limited, Shifnal, England
Filed Nov. 25, 1964, Ser. No. 413,809
Claims priority, application Great Britain, Dec. 5, 1963, 48,051/63
5 Claims. (Cl. 114—220)

This invention relates to fenders for protecting dock walls, quoins, bridge piers and the like, and also the hulls of ships contacting them.

When a ship is manoeuvring to enter docks or other narrow channels, it tends to ride aginst one point in order to align for entry into the narrows, thus imparting considerable thrust on the dock or wharf structure as well as inducing damaging forces to the belt of the hull itself.

The invention consists in a dock or like fender comprising a resilient roller rotatably mounted in bearings attachable to a dock wall or the like, the bearings being resiliently mounted in rigid housings by resilient means surrounding the bearings so as to yield resiliently to loads imparted from any angle.

Conventionally the roller comprises an inner rigid shaft, e.g. of steel, a layer of soft resilient material and an outer sleeve or tube of hard resilient material.

The invention will be further described with reference to the accompanying drawings of preferred forms of the invention, and wherein:

FIGURE 3 is a scrap view, similar to a part of FIGURE 1, showing a modification;

FIGURE 4 is an elevation, similar to part of FIGURE 1 showing a further modification; and FIGURE 5 is an end view of the structure of FIGURE 4.

Figure 1:
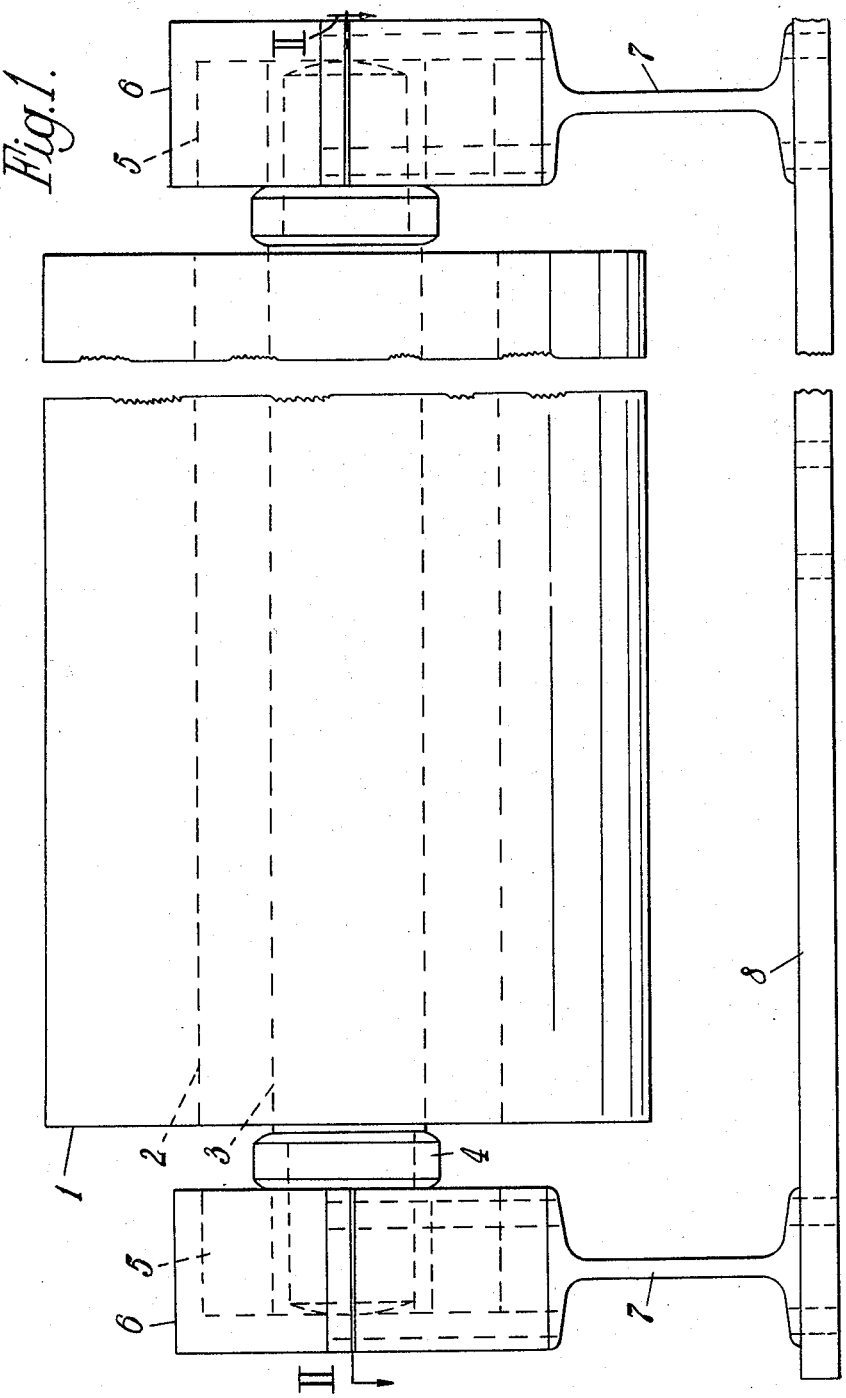
FIGURE 1 is an elevation of a first form of fender according to the invention.
Figure 2:
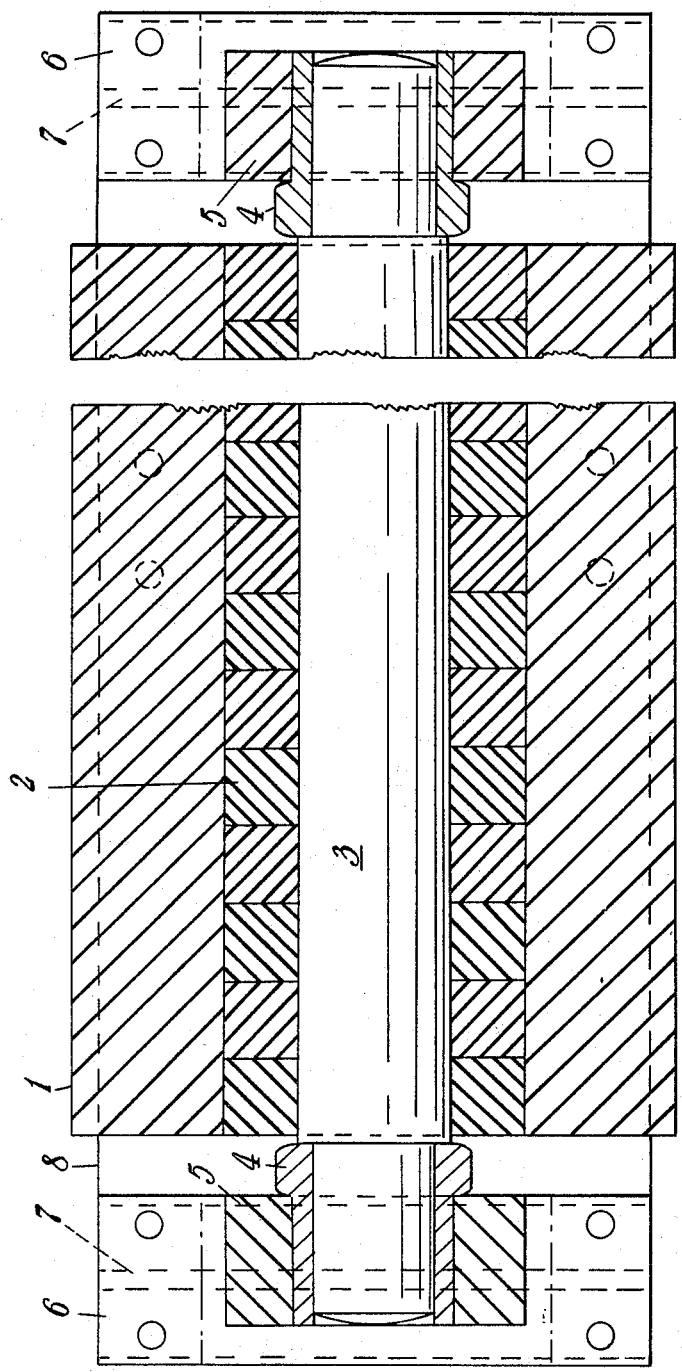
FIGURE 2 is a section on the line II—II of FIGURE 1.

Referring first to FIGURES 1 and 2, a fender unit is shown as comprising of a tubular rubber body 1 of high Shore hardness, backed up by a series of rubber discs 2 of lesser Shore hardness which are in turn, backed up by a steel shaft 3 of substantial size. The shaft 3 has bearings at each end which are mounted in shell bearings 4 of non-metallic material suitable for water lubrication. The shell bearings 4 are carried in resilient rubber housings 5 which are in turn carried by rigid metal housings 6 to suit the installation.

The rigid housings are shown in FIGURE 1 as mounted by means of I section supports 7 upon a base plate 8, adapted to be rigidly attached to the dock wall or the like where desired.

The ship contacts first on the outer tubular body 1 and causes therein a deflection and a rotation. At the same time as the outer body 1 is being deformed, the inner body 2 is also deflecting to accommodate a proportion of the thrust. To facilitate alignability with the vessel and to give further deflection, the bearing shaft 3 is free to move laterally in the bearing housings 6, the rubber mounting blocks 5 displacing under the load, the bearing shells 4 being of sufficient strength to allow free rotation of the shaft 3 under these conditions.

FIGURE 3 shows an alternative form of mounting for the I section supports 7 on the base plate 8, with interposition of a resilient support pad 9 of rubber.

FIGURE 4 shows how the outer tubular body 1 may be supported by a pair of parallel steel shafts 10 mounted in contact with the body 1 and supported in plain bearings 11 fixed in the I section supports 7.

These shafts 10 are in rolling contact with the body 1 and thus provide increased stability of the rubber body 1 and a roller action to counteract the back swell of the rubber.

Various other modifications may be made within the scope of the invention claimed.

I claim:

1. A fender for protecting structures such as dock walls, ship's hulls and like structures comprising rigid housing means attachable to the structure, non-metallic shell-bearing means resiliently mounted in the said rigid housing means, a resilient roller comprising an inner rigid shaft rotatably mounted in the said shell bearing means a layer of soft resilient material and an outer sleeve of hard resilient material, and resilient housing means encircling the shell bearing means to provide the resilient mounting therefor and to enable the shell-bearing means to yield resiliently to loads applied at any angle.

2. A fender as claimed in claim 1, comprising a baseplate adapted to be mounted on the structure and resilient rubber mounting means supporting the rigid housing means on the base plate.

3. A fender as claimed in claim 1, in which the soft resilient material is made up by a series of rings coaxial with the shaft.

4. A fender as claimed in claim 1, comprising plain bearings fixedly connected to the rigid housing means, and shaft means rotatably mounted in the said plain bearings, the shaft means being in rolling contact with the outer sleeve of the resilient roller at a position remote from contact with a body moving relative to the structure.

5. A fender as claimed in claim 4, in which the shaft means comprise a pair of parallel shafts.

References Cited by the Examiner

UNITED STATES PATENTS

| 1,145,749 | 7/1915 | Claud | 114—220 |
| 1,457,259 | 5/1923 | Malluk et al. | 293—71 X |
| 2,588,171 | 3/1952 | Smith | 248—8 |
| 2,952,979 | 9/1960 | Rolando | 114—220 X |
| 3,039,831 | 6/1962 | Thomas | 308—26 |
| 3,058,738 | 10/1962 | Corson et al. | 267—1 |
| 3,106,182 | 10/1963 | Burleigh | 114—220 |

MILTON BUCHLER, *Primary Examiner.*

B. BELKIN, *Assistant Examiner.*